United States Patent
Huang

(10) Patent No.: US 10,157,115 B2
(45) Date of Patent: Dec. 18, 2018

(54) DETECTION SYSTEM AND METHOD FOR BASEBOARD MANAGEMENT CONTROLLER

(71) Applicant: CLOUD NETWORK TECHNOLOGY SINGAPORE PTE. LTD., Singapore (SG)

(72) Inventor: Yu-Chen Huang, New Taipei (TW)

(73) Assignee: Cloud Network Technology Singapore Pte. Ltd., Singapore (SG)

(*) Notice: Subject to any disclaimer, the term of this patent is extended or adjusted under 35 U.S.C. 154(b) by 335 days.

(21) Appl. No.: 14/862,346

(22) Filed: Sep. 23, 2015

(65) Prior Publication Data

US 2017/0083425 A1    Mar. 23, 2017

(51) Int. Cl.
| | | |
|---|---|---|
| G06F 11/00 | (2006.01) | |
| G06F 11/32 | (2006.01) | |
| G06F 11/14 | (2006.01) | |
| G06F 11/30 | (2006.01) | |
| G06F 13/24 | (2006.01) | |
| G06F 13/42 | (2006.01) | |

(52) U.S. Cl.
CPC ........ G06F 11/327 (2013.01); G06F 11/1446 (2013.01); G06F 11/1471 (2013.01); G06F 11/3027 (2013.01); G06F 11/3031 (2013.01); G06F 13/24 (2013.01); G06F 13/4282 (2013.01); *G06F 2201/84* (2013.01); *G06F 2201/86* (2013.01)

(58) Field of Classification Search
CPC ............. G06F 11/1441; G06F 13/4282; G06F 1/3228; G06F 2209/505; G06F 3/0658; G06F 11/327; G06F 11/00; G06F 11/3031; G06F 11/3058
See application file for complete search history.

(56) References Cited

U.S. PATENT DOCUMENTS

| | | | | |
|---|---|---|---|---|
| 6,496,790 B1* | 12/2002 | Kathavate | ............ | G01R 31/317 |
| | | | | 702/188 |
| 8,024,609 B2* | 9/2011 | Suffern | ............... | G06F 11/0793 |
| | | | | 714/25 |
| 8,776,235 B2* | 7/2014 | Coronado | ............. | H04L 63/145 |
| | | | | 709/224 |
| 8,898,349 B1* | 11/2014 | Mondal | ................ | G06F 13/385 |
| | | | | 710/15 |
| 9,921,915 B2* | 3/2018 | Hung | ................... | G06F 11/1417 |
| 10,037,170 B2* | 7/2018 | Yang | ....................... | G06F 3/067 |
| 2002/0138772 A1* | 9/2002 | Crawford | ................... | G06F 1/30 |
| | | | | 713/300 |
| 2005/0055474 A1* | 3/2005 | Yang | .................... | G06F 11/3058 |
| | | | | 710/15 |

(Continued)

*Primary Examiner* — Loan L. T. Truong
(74) *Attorney, Agent, or Firm* — ScienBiziP, P.C.

(57) ABSTRACT

A detection system for a baseboard management controller (BMC) provides a motherboard and a BMC. The motherboard sends a detection command to the BMC, the command requiring the BMC to send a response value to the motherboard. A determination unit determines whether the motherboard receives the response value within a preset time. When the motherboard does not receive the response value within the preset time, the determination unit determines that the BMC works abnormally and issues warnings. A detection method is also provided.

13 Claims, 2 Drawing Sheets

(56) References Cited

U.S. PATENT DOCUMENTS

| | | | |
|---|---|---|---|
| 2006/0106577 A1* | 5/2006 | Hatakeyama | G08B 13/2402 702/183 |
| 2006/0255958 A1* | 11/2006 | Jiang | H02J 7/0047 340/636.1 |
| 2007/0088988 A1* | 4/2007 | Gupta | G06F 11/2268 714/48 |
| 2007/0168738 A1* | 7/2007 | Wang | G06F 11/2284 714/36 |
| 2007/0244708 A1* | 10/2007 | Locker | G06F 21/575 705/307 |
| 2008/0074065 A1* | 3/2008 | Lo | F04D 25/166 318/268 |
| 2009/0019544 A1* | 1/2009 | Suffern | H04L 63/1441 726/22 |
| 2009/0089295 A1* | 4/2009 | Lambert | G06F 1/181 |
| 2009/0282233 A1* | 11/2009 | Wang | G06F 11/0754 713/2 |
| 2010/0042769 A1* | 2/2010 | Lee | G06F 13/409 710/301 |
| 2010/0250754 A1* | 9/2010 | Birch | H04L 69/16 709/228 |
| 2011/0029789 A1* | 2/2011 | Tsai | G06F 1/26 713/300 |
| 2011/0145620 A1* | 6/2011 | Shih | G06F 1/28 713/340 |
| 2011/0279145 A1* | 11/2011 | Chen | G06F 1/305 324/764.01 |
| 2012/0011402 A1* | 1/2012 | Chen | G06F 11/2284 714/25 |
| 2012/0043993 A1* | 2/2012 | Xi | G06F 1/30 327/80 |
| 2012/0110379 A1* | 5/2012 | Shao | G06F 11/1417 714/15 |
| 2012/0136970 A1* | 5/2012 | Chen | G06F 11/0784 709/219 |
| 2012/0166605 A1* | 6/2012 | Chou | G06F 11/3006 709/223 |
| 2012/0280823 A1* | 11/2012 | Yang | G08B 21/10 340/669 |
| 2012/0296583 A1* | 11/2012 | Cong | G06F 1/266 702/58 |
| 2013/0055002 A1* | 2/2013 | Brooks | G06F 1/266 713/340 |
| 2013/0080752 A1* | 3/2013 | Liao | G06F 9/4403 713/1 |
| 2013/0159789 A1* | 6/2013 | Wang | G06F 11/0751 714/48 |
| 2013/0238787 A1* | 9/2013 | Ohtake | G06F 11/2033 709/224 |
| 2013/0318389 A1* | 11/2013 | Cong | G06F 1/28 713/340 |
| 2014/0142764 A1* | 5/2014 | Chen | H05K 7/20209 700/276 |
| 2014/0229758 A1* | 8/2014 | Richardson | G06F 11/3006 714/4.11 |
| 2014/0317457 A1* | 10/2014 | Cai | G06F 11/321 714/51 |
| 2015/0058542 A1* | 2/2015 | Chao | H05K 7/1498 711/103 |
| 2015/0100296 A1* | 4/2015 | Chen | H04L 43/50 703/21 |
| 2015/0121152 A1* | 4/2015 | Chen | G06F 9/4406 714/47.1 |
| 2015/0186150 A1* | 7/2015 | Chung | G06F 9/4408 711/103 |
| 2015/0193336 A1* | 7/2015 | Zhou | G06F 11/0706 711/103 |
| 2015/0355651 A1* | 12/2015 | Balakrishnan | G05B 15/02 700/299 |
| 2016/0099886 A1* | 4/2016 | Rao | G06F 9/5061 709/226 |
| 2016/0118121 A1* | 4/2016 | Kelly | G06F 13/4068 710/301 |
| 2016/0349830 A1* | 12/2016 | Omata | G06F 1/26 |
| 2017/0054597 A1* | 2/2017 | Maeda | H04L 41/084 |
| 2017/0060214 A1* | 3/2017 | Yang | G06F 1/28 |
| 2017/0109235 A1* | 4/2017 | Hung | G06F 11/1417 |
| 2017/0147453 A1* | 5/2017 | Huang | G06F 11/2007 |
| 2018/0145869 A1* | 5/2018 | Hu | H04L 41/0654 |

* cited by examiner

DETECTION SYSTEM AND METHOD FOR BASEBOARD MANAGEMENT CONTROLLER

FIELD

The subject matter herein generally relates to control systems.

BACKGROUND

Generally, the baseboard management controller (BMC) is configured for monitoring the operation states (such as temperature and power consumption) of a server system.

BRIEF DESCRIPTION OF THE DRAWINGS

Implementations of the present technology will now be described, by way of example only, with reference to the attached figures.

DETAILED DESCRIPTION

Figure 1:
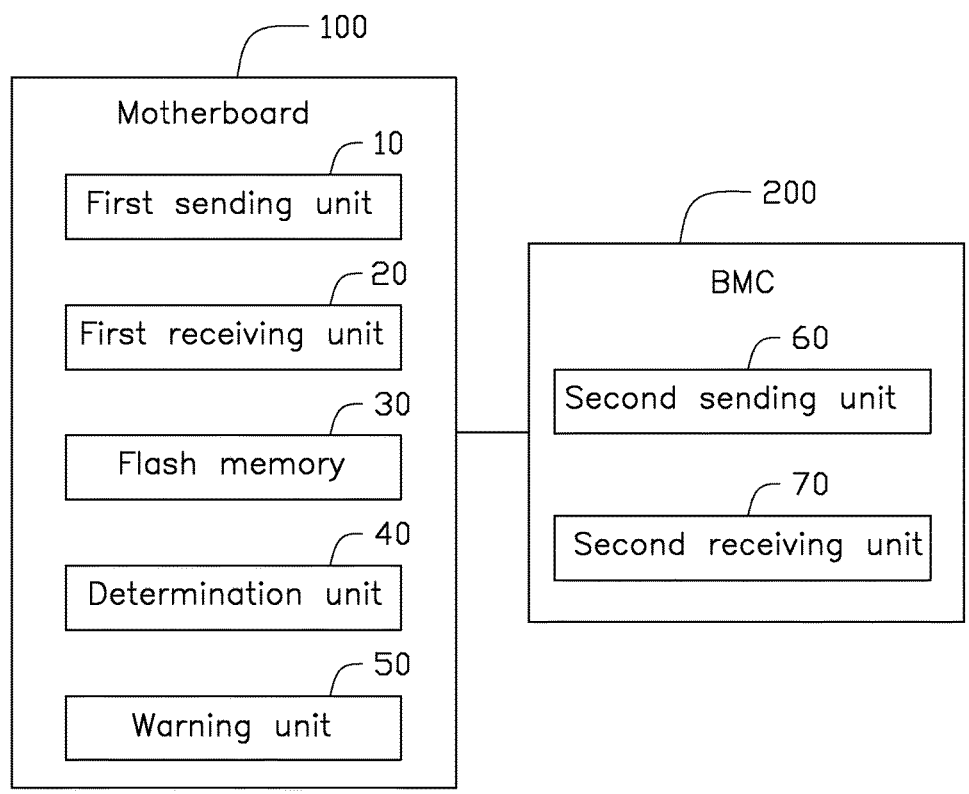
FIG. 1 is a block diagram of an example embodiment of a BMC detection system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series and the like.

FIG. 1 illustrates detection system for a baseboard management controller (BMC) of the present disclosure. The detection system in accordance with an exemplary embodiment can comprise a motherboard 100 and a BMC 200. The BMC 200 is electrically coupled to the motherboard 100 through an intelligent platform management interface (IPMI) or an inter-integrated circuit (I2C) bus.

In the illustrated embodiment, the motherboard 100 can detect states of the BMC 200. The motherboard 100 can comprise a first sending unit 10, a first receiving unit 20, a flash memory 30, a determination unit 40, and a warning unit 50. The first sending unit 10 is configured for sending a detection command to the BMC 200 to start a time interval (such as 60 seconds). In the illustrated embodiment, the detection command can be configured to control the BMC 200 to send back a response value to the first receiving unit 20 of the motherboard 100 when the BMC 200 receives the detection command.

In the illustrated embodiment, the flash memory 30 can be configured to store a system event log (SEL) relating to the BMC 200. The SEL can be configured to record fault information of the BMC 200 when the BMC 200 works abnormally.

In the illustrated embodiment, the determination unit 40 sets a preset time (such as 5 seconds), and further determines whether the first receiving unit 20 receives the response value within the preset time. In the illustrated embodiment, the time interval is longer than the preset time.

In the illustrated embodiment, when the first receiving unit 20 receives the response value within the preset time, the determination unit 40 determines that the BMC 200 works normally.

In the illustrated embodiment, when the first receiving unit 20 does not receive the response value within the preset time, the determination unit 40 determines that the BMC 200 works abnormally. The first sending unit 10 of the motherboard 100 sends a system control interrupt (SCI) command to the BMC 200, to reset the BMC 200. The motherboard 100 stores the SEL to the flash memory 30.

In the illustrated embodiment, the warning unit 50 can be configured to display the warning information according to the determination of abnormal working by the determination unit 40.

In the illustrated embodiment, the BMC 200 can comprise a second sending unit 60 and a second receiving unit 70. The second receiving unit 70 obtains the detection command from the first sending unit 10 of the motherboard 100. The second sending unit 60 sends the response value to the first receiving unit 20 when the second receiving unit 70 obtains the detection command.

In operation, the first sending unit 10 of the motherboard 100 sends the detection command to the BMC 200. The determination unit 40 determines whether the first receiving unit 20 receives the response value within the preset time. When the first receiving unit 20 receives the response value within the preset time, the determination unit 40 determines that the BMC 200 works normally. The warning unit 50 outputs a first warning information (such as a light emitting component of the motherboard displaying a yellow light).

When the first receiving unit 20 does not receive the response value within the preset time, the determination unit 40 determines that the BMC 200 works abnormally. Thus the first sending unit 10 of the motherboard 100 sends the SCI command to the BMC 200, to reset the BMC 200. The motherboard 100 stores the SEL to the flash memory 30. The warning unit 50 outputs a second warning information (such as the light emitting component of the motherboard displaying a red light).

Figure 2:
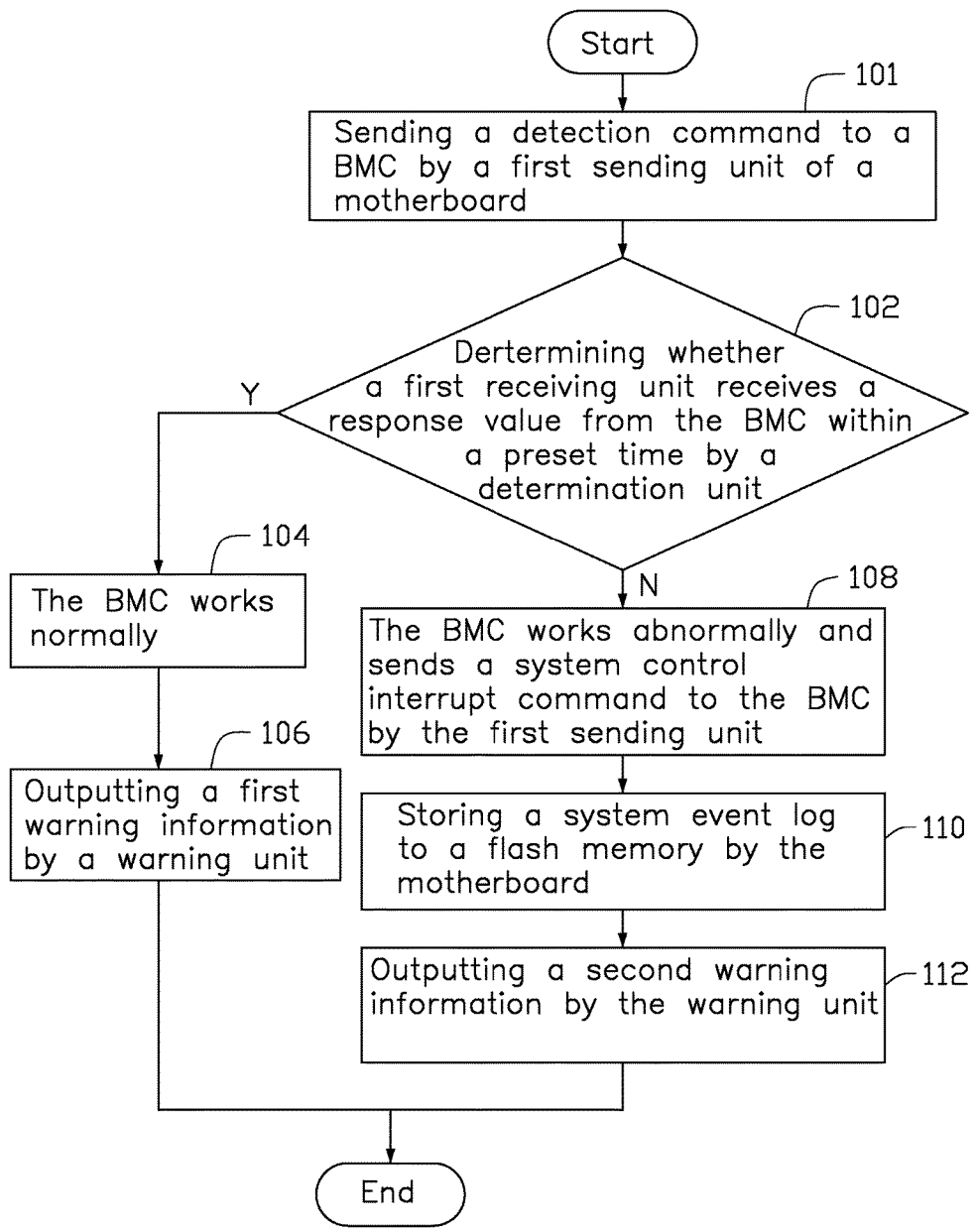
FIG. 2 is a flow chart of an example embodiment of a detection method of the BMC detection system of FIG. 1.

Referring to FIG. 2, a flowchart is presented in accordance with an embodiment which is being thus illustrated. The example method is provided by way of example, as there are a variety of ways to carry out the method. The method described below can be carried out using the configurations illustrated in FIG. 1, for example, and various elements of these figures are referenced in explaining example method. Blocks shown in FIG. 2 represents one or more processes, methods, or subroutines, carried out in the test method. Furthermore, the illustrated order of blocks is by example only and the order of the blocks can change. Additional blocks may be added or fewer blocks may be utilized, without departing from this disclosure. The detection method for a BMC can begin at block 101.

At block 101, a first sending unit 10 of a motherboard 100 sends the detection command to a baseboard management controller (BMC) 200 to start a time interval (such as 60 seconds). The detection command can be configured to control a second sending unit 60 of the BMC 200 to send back a response value to a first receiving unit 20 of the motherboard 100 when a second receiving unit 70 of BMC 200 receives the detection command. In the illustrated embodiment, the motherboard 100 communicates with the BMC 200 through an intelligent platform management interface (IPMI) or an inter-integrated circuit (I2C) bus.

At block 102, a determination unit 40 of the motherboard 100 determines whether a first receiving unit 20 receives a response value from the BMC 200 within a preset time. In the illustrated embodiment, the time interval is longer than the preset time. If the first receiving unit 20 receives the response value within the preset time, block 104 is implemented, otherwise block 108 is implemented.

At block 104, the determination unit 40 determines that the BMC 200 works normally.

At block 106, a warning unit 50 outputs a first warning information (such as the light emitting component of the motherboard displaying a yellow light).

At block 108, the determination unit 40 determines that the BMC 200 works abnormally. The first sending unit 10 of the motherboard 100 then sends a system control interrupt (SCI) command to the BMC 200, to reset the BMC 200.

At block 110, the motherboard 100 stores a system event log (SEL) to a flash memory 30.

At block 112, the warning unit 50 outputs a second warning information (such as the light emitting component of the motherboard displaying a red light).

While the disclosure has been described by way of example and in terms of a preferred embodiment, it is to be understood that the disclosure is not limited thereto. On the contrary, it is intended to cover various modifications and similar arrangements as would be apparent to those skilled in the art. Therefore, the range of the appended claims should be accorded the broadest interpretation so as to encompass all such modifications and similar arrangements.

While the disclosure has been described by way of example and in terms of a preferred embodiment, it is to be understood that the disclosure is not limited thereto. On the contrary, it is intended to cover various modifications and similar arrangements as would be apparent to those skilled in the art. Therefore, the range of the appended claims should be accorded the broadest interpretation so as to encompass all such modifications and similar arrangements.

What is claimed is:

1. A detection system comprising:
   a baseboard management controller (BMC) comprising a first sending unit and a first receiving unit; and
   a motherboard comprising:
      a second sending unit configured for sending a detection command to the first receiving unit of the BMC, the detection command configured for controlling the first sending unit of the BMC to send back a response value;
      a second receiving unit configured for obtaining the response value from the BMC;
      a determination unit configured to determine whether the second receiving unit receives the response value from the BMC within a preset time;
   wherein when the second receiving unit receives the response value within the preset time, the determination unit determines that the BMC works normally;
   wherein when the second receiving unit does not receive the response value within the preset time, the determination unit determines that the BMC works abnormally; and
   wherein the motherboard further comprises a warning unit, and the warning unit displays the warning information when the determination unit determines that the BMC works abnormally.

2. The detection system of claim 1, wherein when the second receiving unit does not receive the response value within the preset time, the second sending unit of the motherboard sends a system control interrupt (SCI) command to the BMC to reset the BMC.

3. The detection system of claim 2, wherein the motherboard comprises a flash memory, when the second receiving unit does not receive the response value within the preset time, the motherboard stores a system event log (SEL) to the flash memory.

4. The detection system of claim 1, wherein the motherboard communicates with the BMC through an intelligent platform management interface (IPMI).

5. The detection system of claim 1, wherein the motherboard communicates with the BMC through an inter-integrated circuit (I2C) bus.

6. The detection system of claim 1, wherein the second sending unit sends the detection command to the BMC per time interval.

7. The detection system of claim 6, wherein the time interval is longer than the preset time.

8. A detection method comprising:
   sending a detection command to a first receiving unit of a baseboard management controller (BMC) by a second sending unit of a motherboard, and controlling a first sending unit of the BMC to send back a response value to a second receiving unit of the motherboard by the detection command;
   determining whether the second receiving unit of the motherboard receives the response value from the BMC within a preset time by a determination unit of the motherboard;
   determining that the BMC works normally by the determination unit when the second receiving unit receives the response value within the preset time;
   determining that the BMC works abnormally by the determination unit when the second receiving unit does not receive the response value within the preset time; and
   displaying a warning information by a warning unit when the BMC is determined to work abnormally.

9. The detection method of claim 8, wherein the detection method further comprises sending a system control interrupt (SCI) command to the BMC to reset the BMC by the second sending unit of the motherboard when the second receiving unit does not receive the response value within the preset time.

10. The detection method of claim 8, wherein the detection method further comprises communicating with the BMC through an intelligent platform management interface (IPMI) by the motherboard.

11. The detection method of claim 8, wherein the detection method further comprises storing a system event log (SEL) to a flash memory by the motherboard when the second receiving unit does not receive the response value within the preset time.

12. The detection method of claim 8, wherein the detection method further comprises sending the detection command to the BMC per time interval by the second sending unit.

13. The detection method of claim 8, wherein the detection method further comprises communicating with the BMC through an inter-integrated circuit (I2C) bus by the motherboard.

* * * * *